(12) United States Patent
Moore et al.

(10) Patent No.: US 6,279,739 B1
(45) Date of Patent: Aug. 28, 2001

(54) COMPACT DISC DISPLAY AND MAILING PACKAGES

(75) Inventors: Melanie Anne Moore, Charlotte, NC (US); Allen Vaughn, Acworth, GA (US); Gerard P. Lux, Charlotte, NC (US)

(73) Assignee: Cadmus Communications Company, Charlotte, NC (US)

( * ) Notice: Subject to any disclaimer, the term of this patent is extended or adjusted under 35 U.S.C. 154(b) by 0 days.

(21) Appl. No.: 09/550,325

(22) Filed: Apr. 14, 2000

Related U.S. Application Data

(60) Provisional application No. 60/170,698, filed on Dec. 14, 1999.

(51) Int. Cl.$^7$ ................................................ B65D 85/57
(52) U.S. Cl. ..................... 206/312; 206/308.1; 206/312
(58) Field of Search ................................ 206/232, 308.1, 206/310, 312, 751, 754, 768; 40/124.08, 124.14

(56) References Cited

U.S. PATENT DOCUMENTS

| | | |
|---|---|---|
| 5,641,063 | 6/1997 | Gambardella et al. . |
| 5,697,496 | 12/1997 | Bauer . |
| 5,775,490 | 7/1998 | Baker et al. . |
| 5,887,714 | 3/1999 | Yeo . |
| 5,901,844 | 5/1999 | Gambardella et al. . |
| 5,906,275 | 5/1999 | Jokic . |
| 5,971,157 | 10/1999 | Howell et al. . |

*Primary Examiner*—David T. Fidei
(74) *Attorney, Agent, or Firm*—Alston & Bird LLP

(57) ABSTRACT

There is provided a package for displaying and mailing media items such as CD's. The package is made from a unitary blank of foldable paperboard and includes a plurality of panels that when the package is formed has a generally rectangular configuration. A second panel and a third panel are foldable under a first panel and a second panel to form the package. Attached to and extending from the first and fourth panels is a pair of pop-up panels abutting each other along a common fold line integral with the first and fourth panels. A semi-circular slit is made in one of the pop-up panels providing a platform for attaching the CD hub thereto. The pop-up display package may also include a tear strip for sealing the package for mailing. In another embodiment a package is formed from a blank having a plurality of panels in a generally rectangular configuration. A first panel is formed and connected along a fold line to a second panel which is in turn formed with and connected along a fold line to a third panel. An opening for viewing a media item is cut from the second panel. A fourth panel connected to the third panel along a fold line and is positioned on the side of the third panel opposite from second panel. A fifth panel is provided which is hingedly attached to fourth panel along a fold line. An opening is cut into the fourth panel to provide a platform for mounting the media item. The panels are folded to form a box-like structure at one end of the package and a media item detachably mounted to the platform. In another embodiment a pair of the box like end portions are provided.

9 Claims, 10 Drawing Sheets

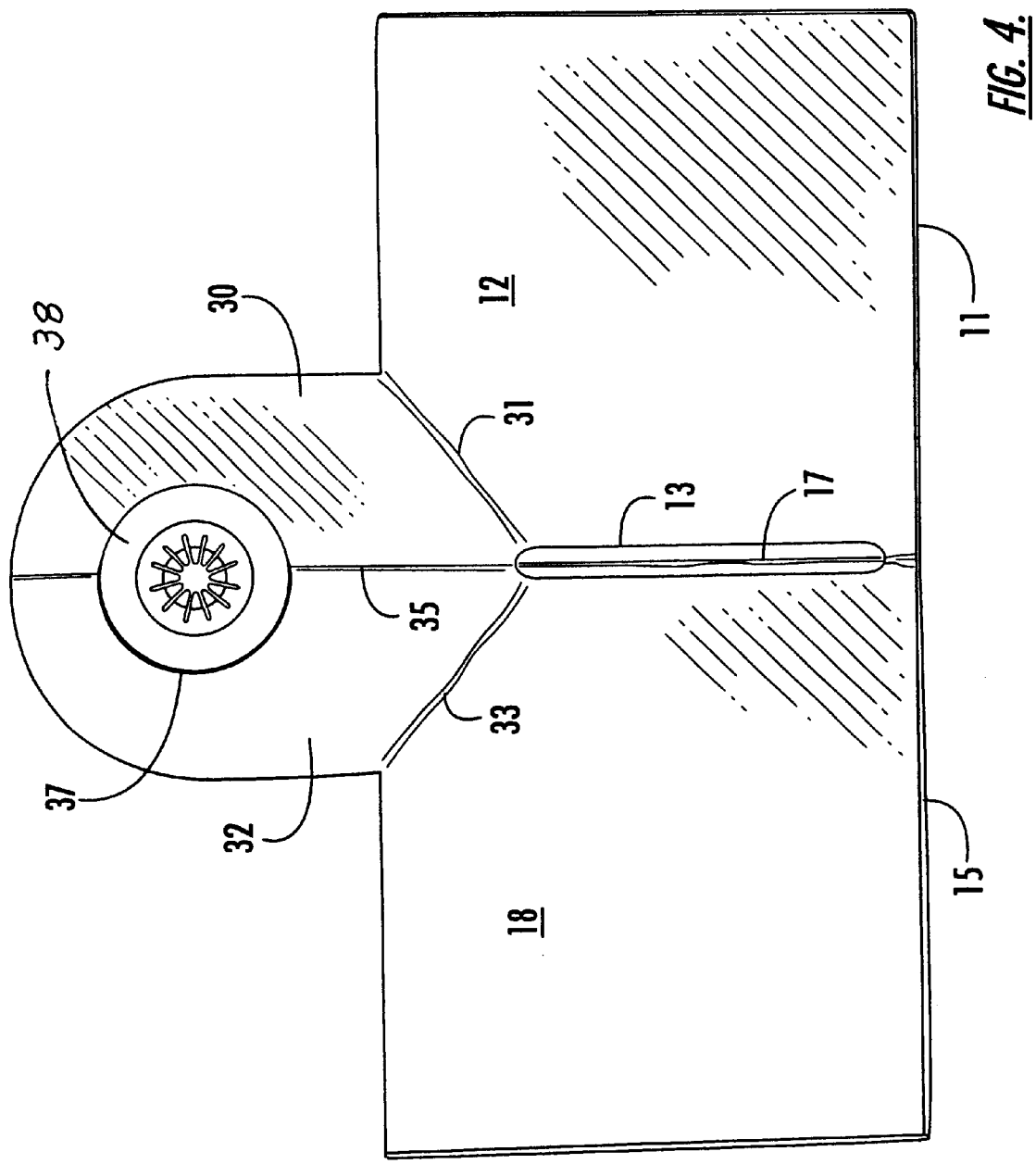

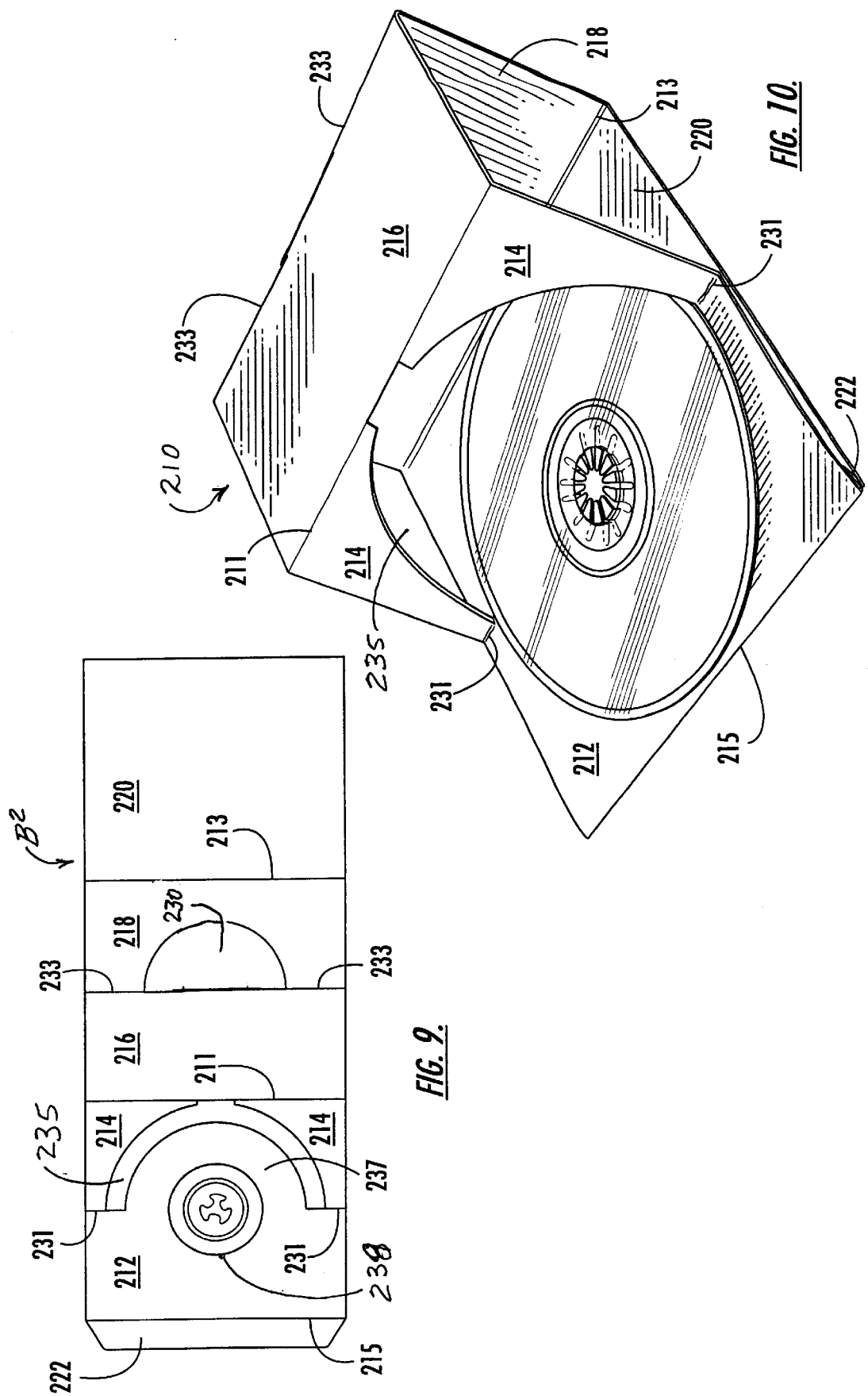

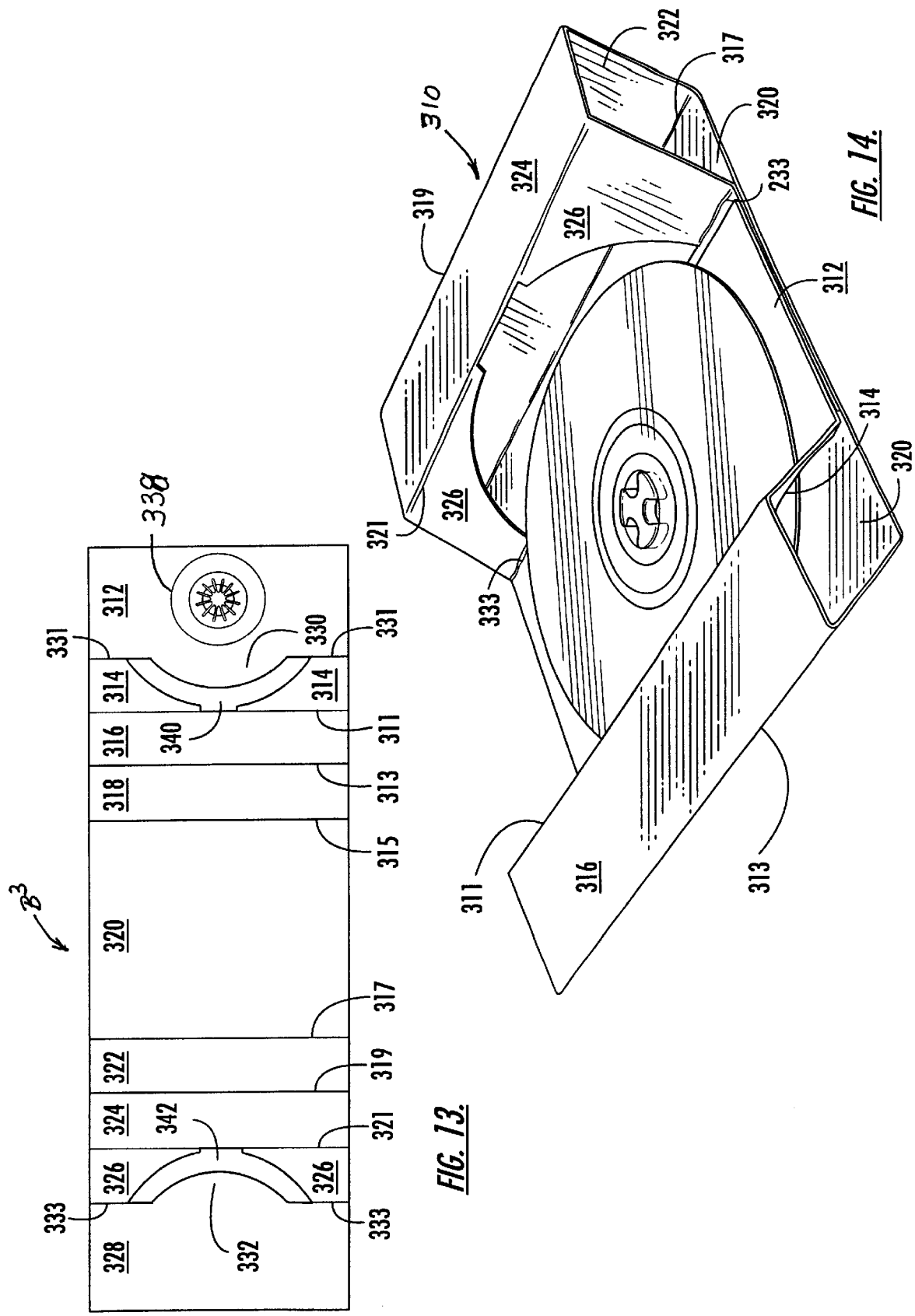

COMPACT DISC DISPLAY AND MAILING PACKAGES

CROSS-REFERENCE TO RELATED APPLICATION

This application claims the benefit of U.S. Provisional Application Ser. No. 60/170,698, filed Dec. 14, 1999, under 35 U.S.C. § 119(e).

FIELD OF THE INVENTION

The present invention relates generally to display packages, and, more particularly, to display packages that are readily movable between a closed position, for protecting a media item such as a compact disc during shipment and handling in an open display position.

BACKGROUND OF THE INVENTION

The ability to ship and display a product in a package so as to entice consumers to purchase the product is an ongoing challenge. This is especially true with regard to items such as compact discs ("CD's"), computer diskettes, plastic cards, and, sample products, collectively referred to as media items. In each case, the provider of the compact disc is interested in providing a package that is capable of protecting the compact disc from damage during shipment and handling and providing a package which is attractive.

Media items, such as compact discs, are frequently packaged in carriers, such as a paperboard box, which often have dimensions exceeding 8×2½×9 inches. These carriers are used even though a video game or other computer program typically includes either a CD ROM disc having a diameter of less than 5" or a 3½" computer diskette. The problem is made worse because in order to retain the CD ROM and the related instructional booklet in place, additional material, often paperboard or corrugated, is placed inside the carrier.

Various products have been developed for the purpose of shipping and displaying compact discs. One example of such a product is disclosed in U.S. Pat. No. 5,971,157 and is directed to a disc package comprised of cardboard that is folded in a tri-fold manner. Another display package for compact discs, that shown in U.S. Pat. No. 5,887,714, discloses a package having a protruding tongue enabling easy removal of a compact disc from the package. In addition, U.S. Pat. No. 5,775,490 provides a compact disc package in which a compact disc is placed in a pocket. Lastly, U.S. Pat. No. 5,641,067 to Gambardella, et al. discloses a display package in which the media item can be both shipped and displayed in a variety of positions.

SUMMARY OF THE INVENTION

It is therefore an object of the present invention to provide a package that is useful to protect a media item such as a compact disc positioned on a hub contained therein during shipment and handling.

Another object of the present invention is to provide a package for a media item which may be used to attractively display the media item.

Yet another object of the present invention is provide a display package for a compact disc in which the compact disc pops-up when the package is opened.

These and other objects, features and advantages of the present invention are obtained by providing a display package for media items comprising a paperboard blank that includes a plurality of panels and has a generally rectangular configuration. A first panel is connected along a common fold line to a second panel, which is in turn hingedly connected, along a fold line to a third panel. The third panel is positioned to one side of second panel. The third panel and a fourth panel are connected to each other along a common fold line. An elongate slot is formed in an area between the first panel and the fourth panel to permit proper folding. Attached to and extending from the first and fourth panels is a pair of pop-up panels abutting each other along a common fold line integral wiffi the first and fourth panels. The pop-up panels extend from the outer edge of the first and fourth panels to a point at the terminus of the elongate slot. A semicircular cut is made in one of the pop-up panels providing a platform for gluing a CD hub thereto. The package is formed by first folding the first panel over a second panel. The first and second panels may be glued to each other using glue or other adhesive. A CD hub is affixed to the fourth panel through a hole in the center thereof and the panel is folded over the third panel and the panels glued to each other. A compact disc or other media item is then placed on the hub. The resulting package then opens and closes along fold lines in a book-like manner. In a second embodiment the pop-up display package of the first embodiment includes a tear strip for sealing the package for mailing.

In a third embodiment a blank having a plurality of panels in a generally rectangular configuration. A first panel is formed and connected along a common fold line to a second panel which is in turn formed with and connected along a fold line to a third panel. A semicircular shaped portion is cut from the second panel. A fourth panel is connected to the third panel along a fold line and is positioned on the side of the third panel opposite from second panel. A fifth panel is provided which is hingedly attached to fourth panel along a fold line. An arch shaped opening is cut into the fourth panel to provide a platform for a CD hub. To assemble the display package the panels are folded along the fold lines to form the display package having a CD placed on the hub. To close the package the third panel is moved slightly forward and in doing so moves downward against the open portion of the fifth panel to form the closed package. A portion of the CD may be observed through the opening. A fourth embodiment is provided which is similar to the third embodiment excepted that a pair of the box like end portion of the third embodiment are present.

BRIEF DESCRIPTION OF THE DRAWINGS

Some of the objects, features and advantages of the present invention having been stated, others will appear as the description proceeds, when taken in conjunction with the accompanying drawings in which:

FIG. 4 is an open view of the embodiment of the display package shown in FIG. 2;

FIG. 9 is a top plan view of a blank used in forming a third embodiment of the display package of the present invention;

FIG. 10 is a perspective view of the display package holding a CD made from the blank shown in FIG. 9;

FIG. 13 is a top plan view of a blank used in forming a fourth embodiment of the present invention;

FIG. 14 is a perspective view of the display package holding a CD made from the blank shown in FIG. 13;

DESCRIPTION OF THE PREFERRED EMBODIMENT

The present invention will now be described more fully hereinafter with reference to the accompanying drawings, in which the preferred embodiment of the invention is shown. This invention may, however, be embodied in different forms and should not be construed as limited to the embodiments set forth herein. Rather, the illustrative embodiment is provided so that this disclosure will be thorough and complete, and will fully convey the scope of the invention to those skilled in the art. Like numbers refer to like elements throughout.

Figure 2:
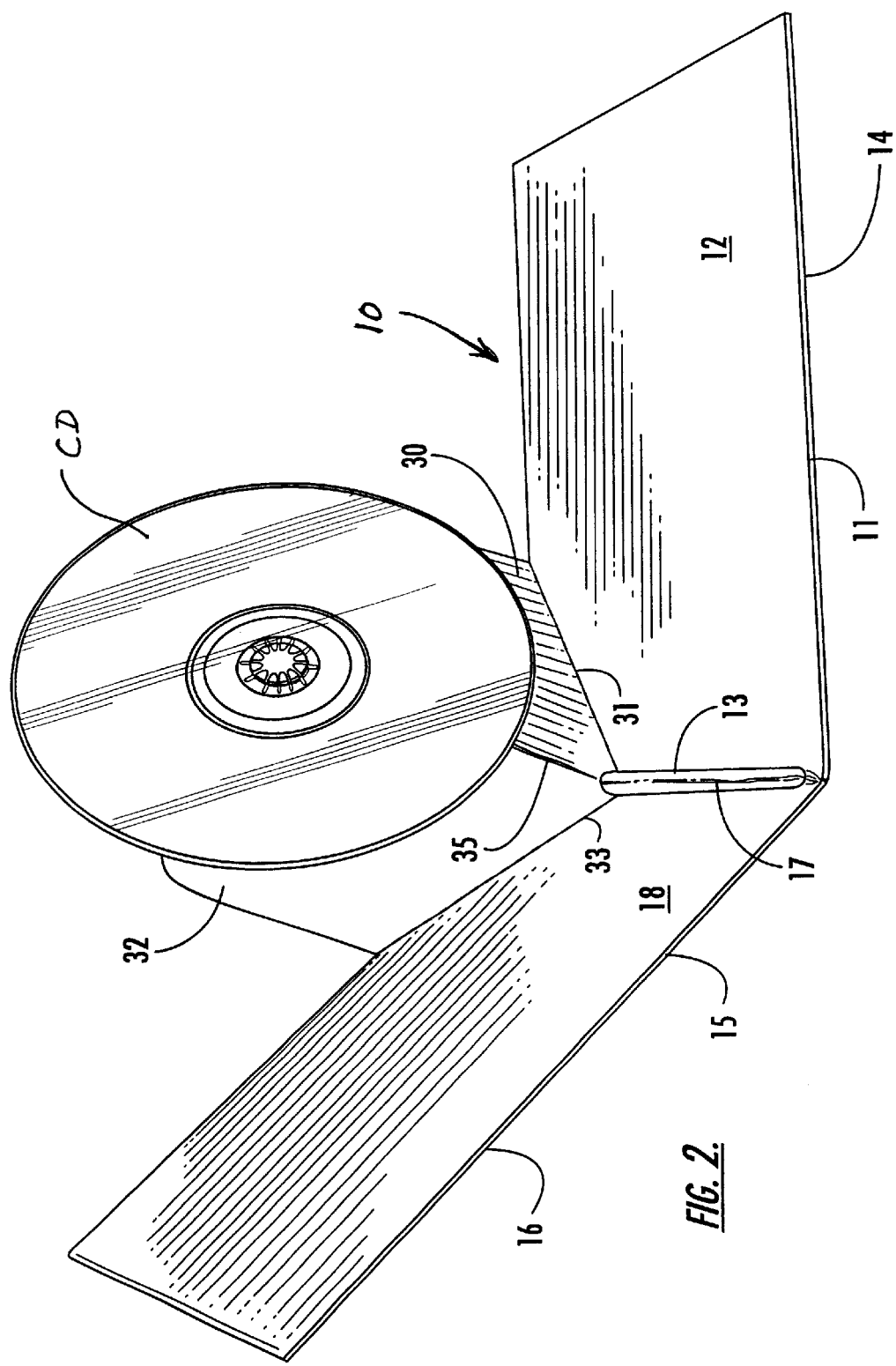
FIG. 2 is a perspective view of the display package holding a CD made from the blank shown in FIG. 1.

Referring first to FIG. 2, there is shown a display package, generally indicated as 10, is designed so that the compact disc is caused to pop-up when the package is opened. The pop-up display package, has a place for a compact disc CD to be retained therein on a hub so that the compact disc is caused to pop-up when the package is opened providing an attractive presentation of the CD. As set forth herein, a media item includes, but is not limited to, compact discs, electronic discs, music discs, computer diskettes, and any other media item that may be temporarily maintained in place on a hub.

Figure 1:
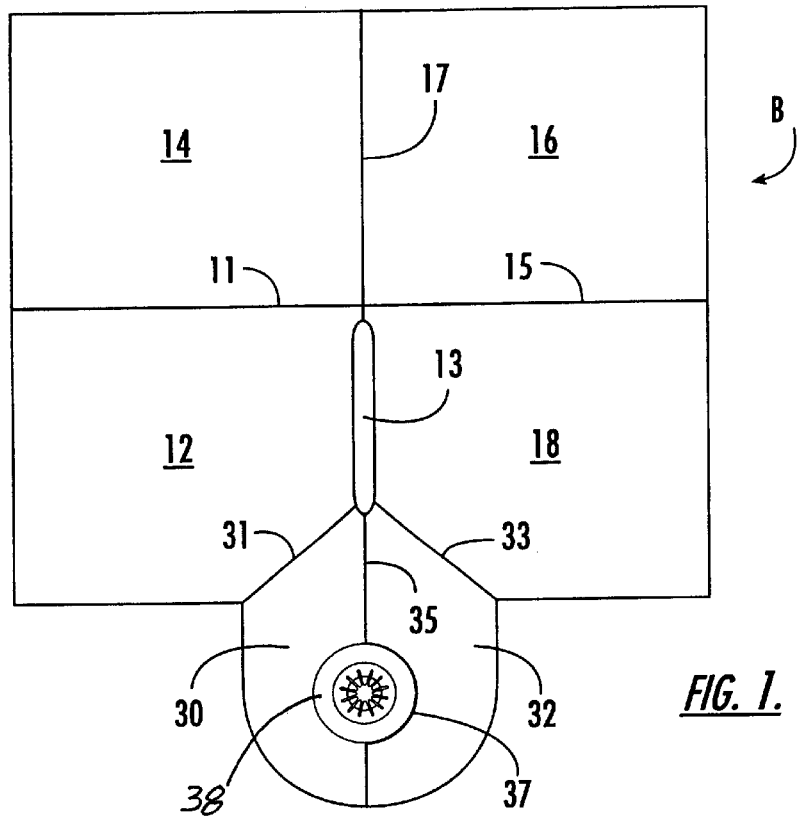
FIG. 1 is a top plan view of a blank used in forming an embodiment of the display package in accordance with the present invention.

As best shown in FIG. 1, the display package 10 of the present embodiment is formed from a unitary blank, generally indicated as B, which is made from a unitary material of uniform thickness. In this embodiment, the material is paperboard (12 or 14 point SBS). It is to be understood that a different quality, color, or gauge of paperboard or alternative materials such as plastic or a light metal alloy, or a combination thereof, may be used to make the display carrier within the spirit of the invention, so long as the material used is capable of being cut and folded while retaining the desired shape of the display carrier. It is also to be understood that a coating or other surface treatment need not be used at all or may only be on one side of the paperboard without departing from the spirit of the invention.

The unitary blank B shown in FIG. 1 includes a plurality of panels and has a generally rectangular configuration. A first panel 12 is integrally formed and hingedly connected along a common fold line 11, to a second panel 14. The second panel 14 is in turn integrally formed with and bingedly connected, along a fold lines 17 to a third panel 16. Third panel 16 is positioned to one side of second panel 14. The third panel 16 and a fourth panel 18 are integrally formed with and hingedly connected, along a common fold line 15, to each other. An elongate slot 13 is defined in the area between the first panel 12 and the fourth panel 18 which slot permits proper folding. The length of first panel 12 and second panel 14 are preferably the same. Also the length of third panel 16 and fourth panel 18 are approximately the same.

Attached to and extending from panels 12 and 18 are pop-up panels 30, 32 abutting each other along fold line 35 and integral with panels 12 and 18 extending from the outer edge of the panels 12, 18 to a point at the terminus of elongate slot 13 along fold lines 31, 33. A semicircular cut 37 is made in pop-up panel 32 adjacent to fold line 35 providing a base 38 for gluing a CD hub thereto. In FIG. 4 there is shown a CD hub attached to base 38 ready to have a CD placed thereon.

Figure 3:
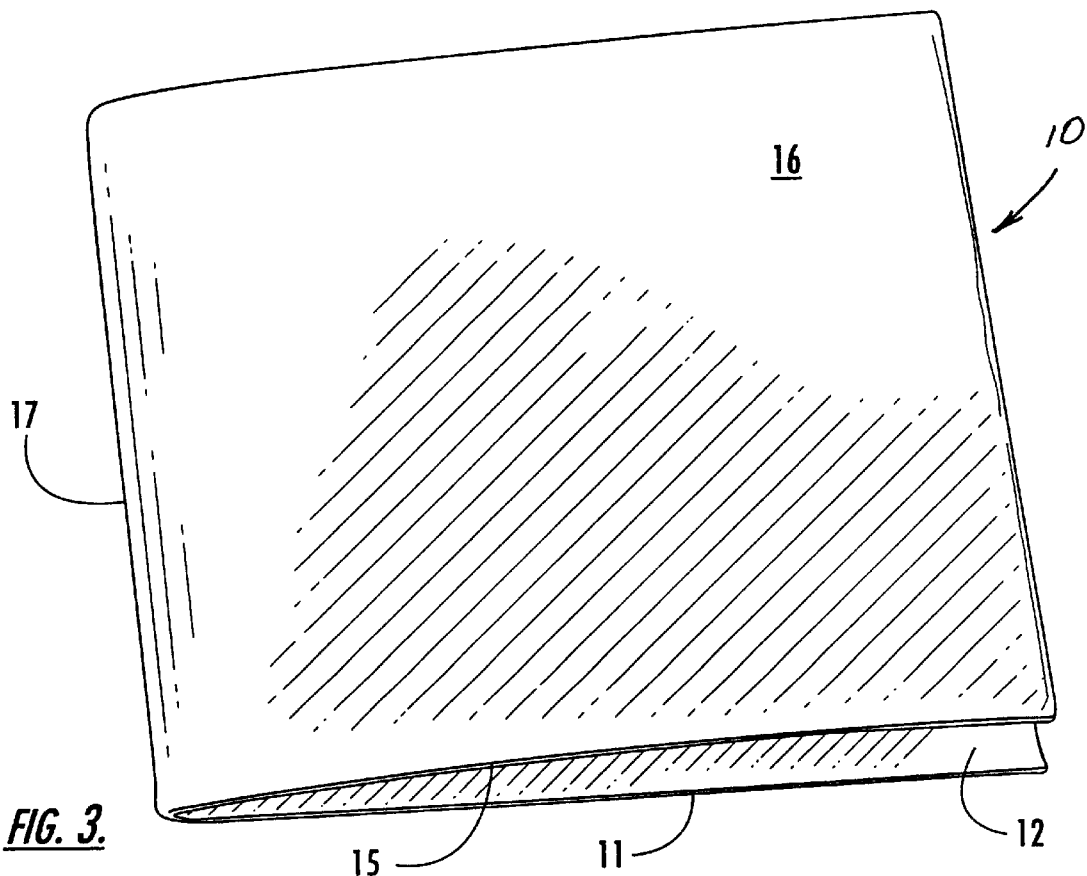
FIG. 3 is a closed view of the embodiment of the display package shown in FIG. 2.

To assemble the display package second panel 14 and third panel 16 are folded under first panel 12 and fourth panel 18 at fold lines 11 and 15, respectively. The second and third panels are glued to the first and fourth panels using glue or other adhesive as shown in FIG. 4. As shown in FIG. 3, a closed display package 10 is then formed by folding panels 16, 18 over panels 12, 14 (or visa versa) along fold line 17. The resulting package then opens and closes along the fold line in a book-like manner.

The common fold lines may be either 50% cut/score lines or a crease fold line.

As is readily understood by those skilled in the art to which the invention relates, each of the common fold lines may be creases, cut/score lines or interrupted cut lines (not shown) as desired. The use of 50% cut/score lines and the crease lines in the present invention were chosen to obtain the desired combination of strength and ease of manufacture and use. To protect the display package 10 and the compact disc CD during shipment and handling, a wrap may be used to encase the display package 10. Typically, the wrap is applied by shrink wrapping or the like so as to provide a plastic barrier to the elements. It is desirable for the wrap to be transparent or at least translucent so that the indicia on the display package can be easily seen.

There is shown in FIGS. 5–8 a second embodiment of the present invention. This embodiment of the invention, which is similar to the first embodiment, is illustrated by reference to FIG. 5 in which there is shown unitary blank B$^1$ having a plurality of panels and a generally rectangular configuration. A first panel 112 is integrally formed and hingedly connected along a common fold line 111 to a rectangular second panel 114. The second panel 114 is in turn integrally formed with and hingedly connected, along a common fold line 117 to a third rectangular panel 116. The third panel 116 and a fourth panel 118 are integrally formed with and hingedly connected, along a common fold line 115, to each other. The width of panel 112 is somewhat narrower that panel 114 and panel 118 is somewhat narrower that panel 116. An elongate slot 113 is defined in the area between the first panel 112 and the fourth panel 118 that permits proper folding. The length of first panel 112 and second panel 114 are preferably the same. Also the length of third panel 116 and fourth panel 118 are approximately the same.

Figure 6:
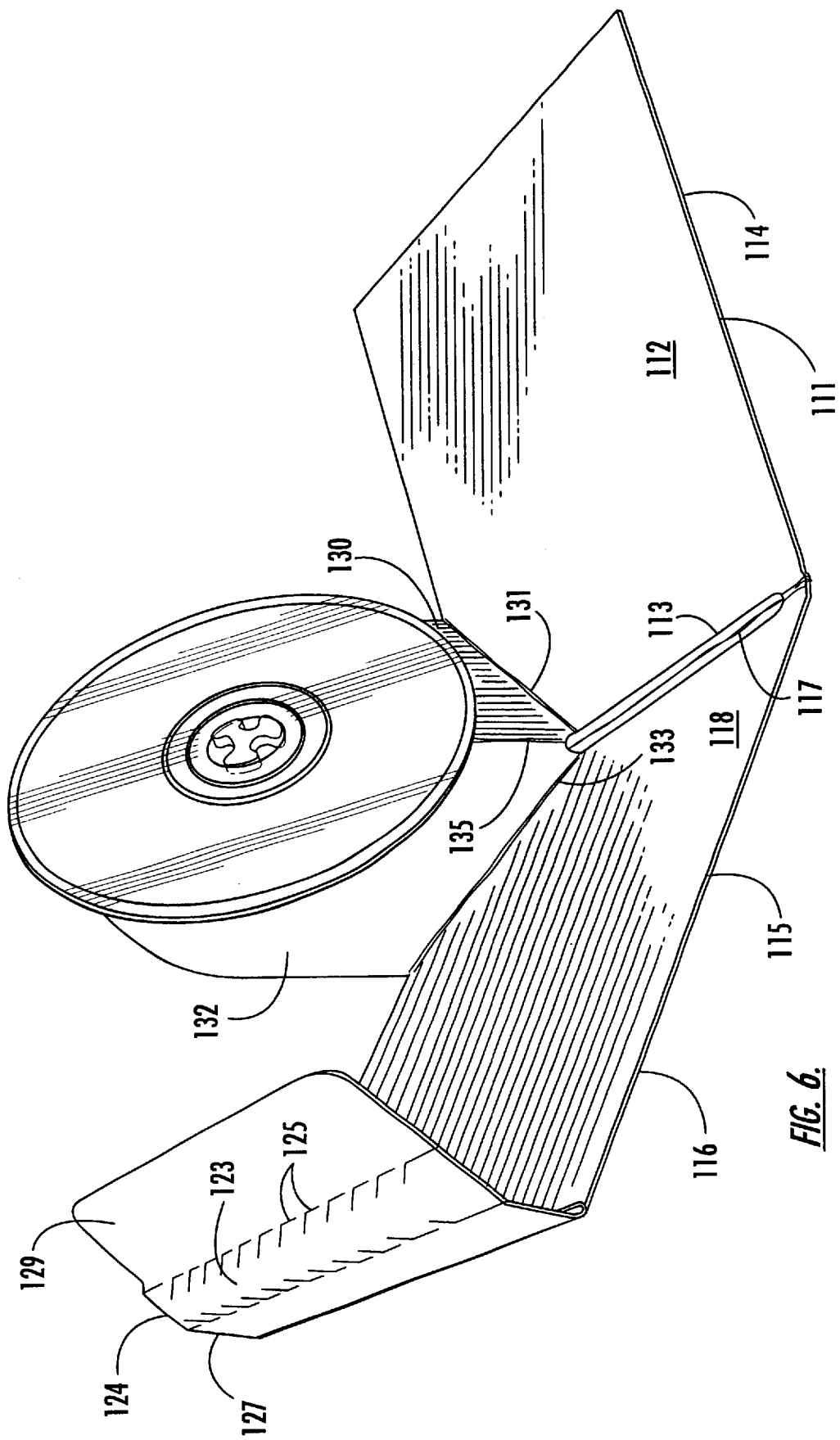
FIG. 6 is a perspective view of the blank of FIG. 5 in a partially open display position in accordance with the present invention.

Attached to and extending from panels 112 and 118 are pop-up panels 130, 132 abutting each other along fold line 135 and integral with panels 112 and 118 extending from the outer edge of the panels 112, 118 to a point at the terminus of elongate slot 113 along fold lines 131, 133. A semicircular cut 137 is made in the fold line 135 providing a base 138 for gluing a CD hub thereto. In FIG. 6 there is shown a CD hub attached to base 138 having a CD placed thereon.

Figure 5:
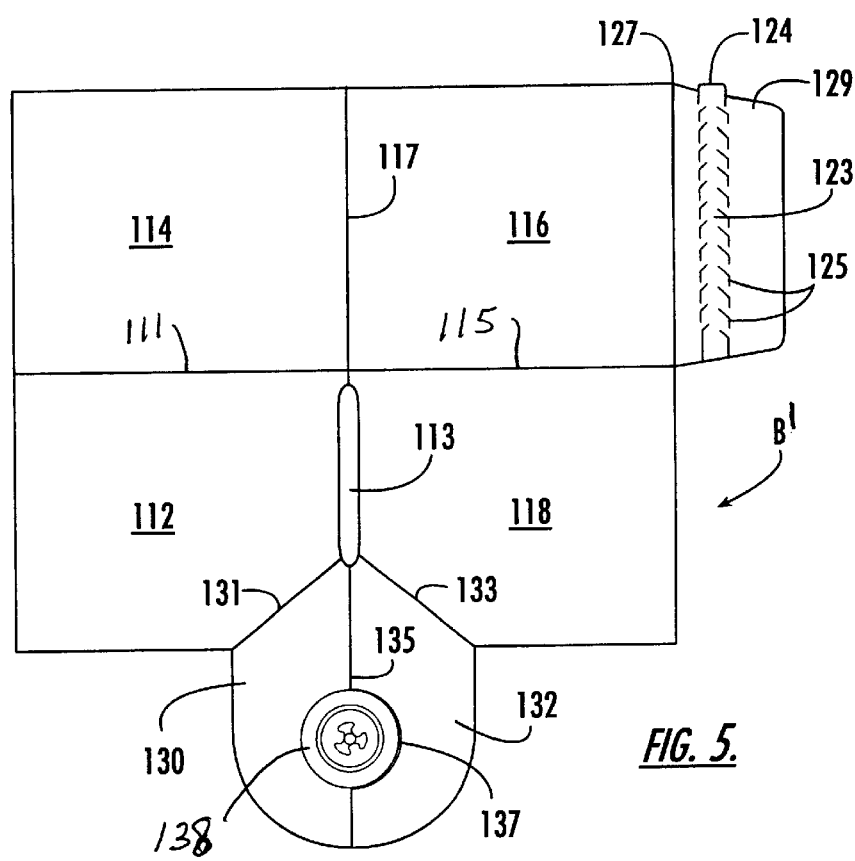
FIG. 5 is a top plan view of a blank used in forming a second embodiment of the present invention, which includes a tear strip.

The blank B[1], shown in FIG. 5 also has a tear panel 129 is joined to panel 116 at the side opposite panel 114. The tear panel 129 has a with a tear-off strip 123 having a pull tab 124 created by a parallel set of zipper rules 125 cut through the panel 129, whereby the strip 123 may be torn away from the panel 129 to open the package 110. The tear panel is joined to a panel 116 at score line 127.

Figure 7:
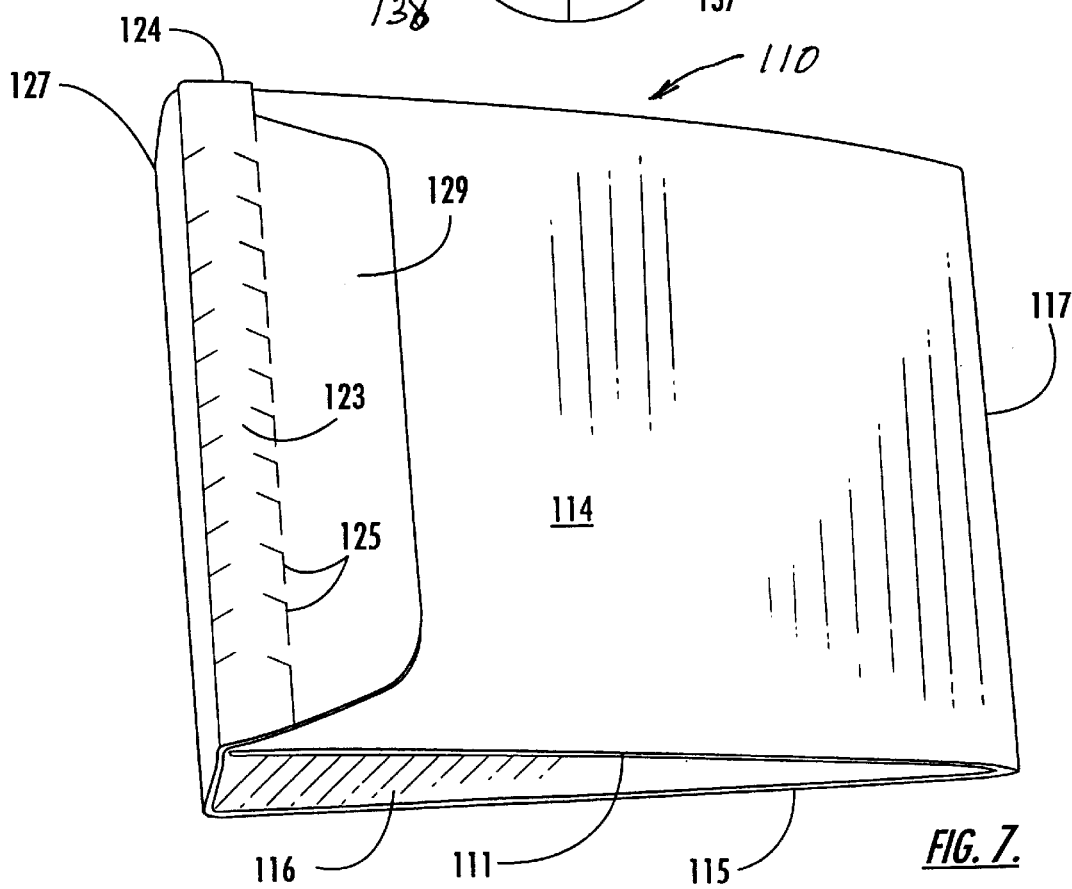
FIG. 7 is a closed view of the embodiment of the display package shown in FIG. 5.
Figure 8:
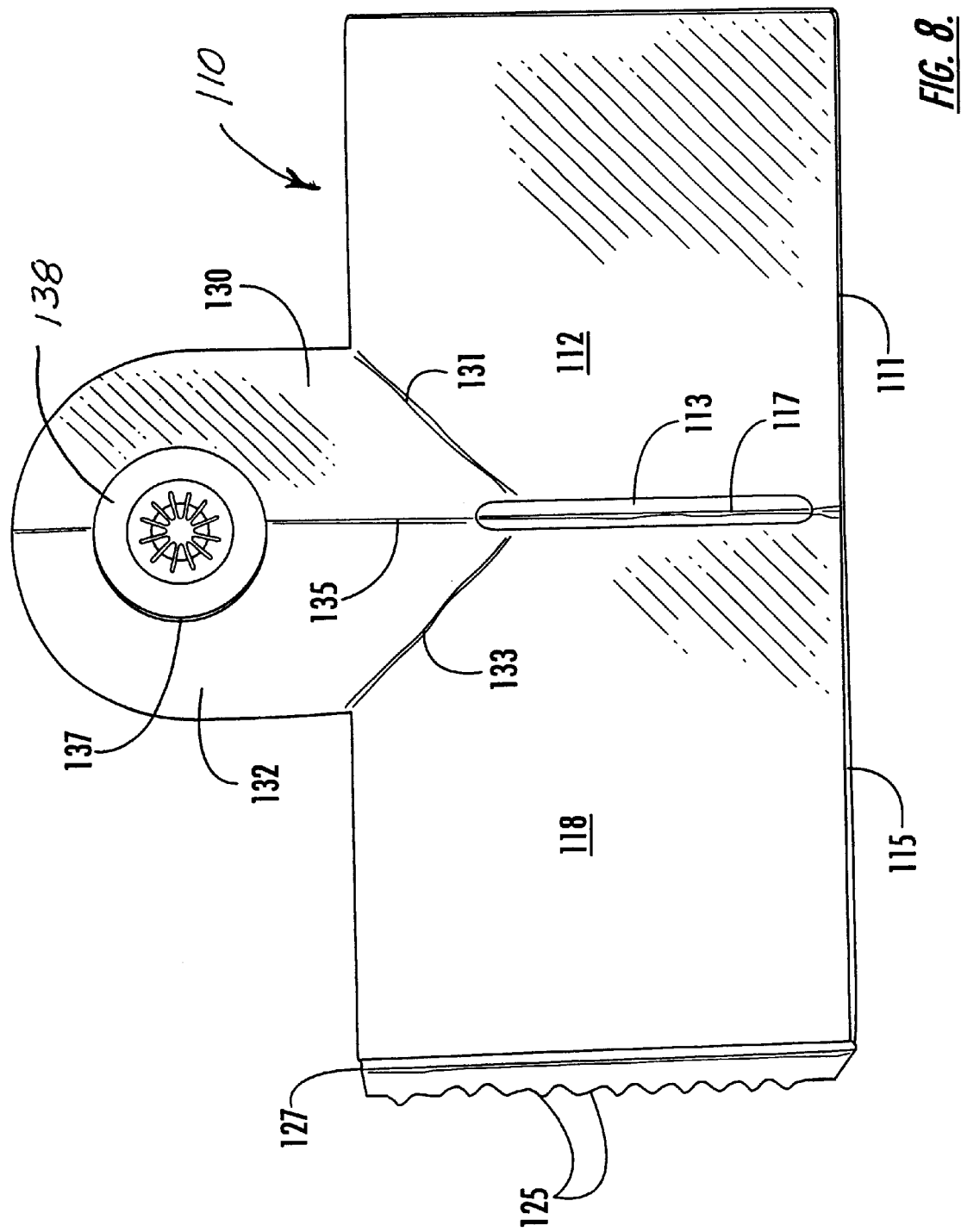
FIG. 8 is a mostly open view of the embodiment of the display package of the embodiment shown in FIG. 5 of the present invention.
Figure 11:
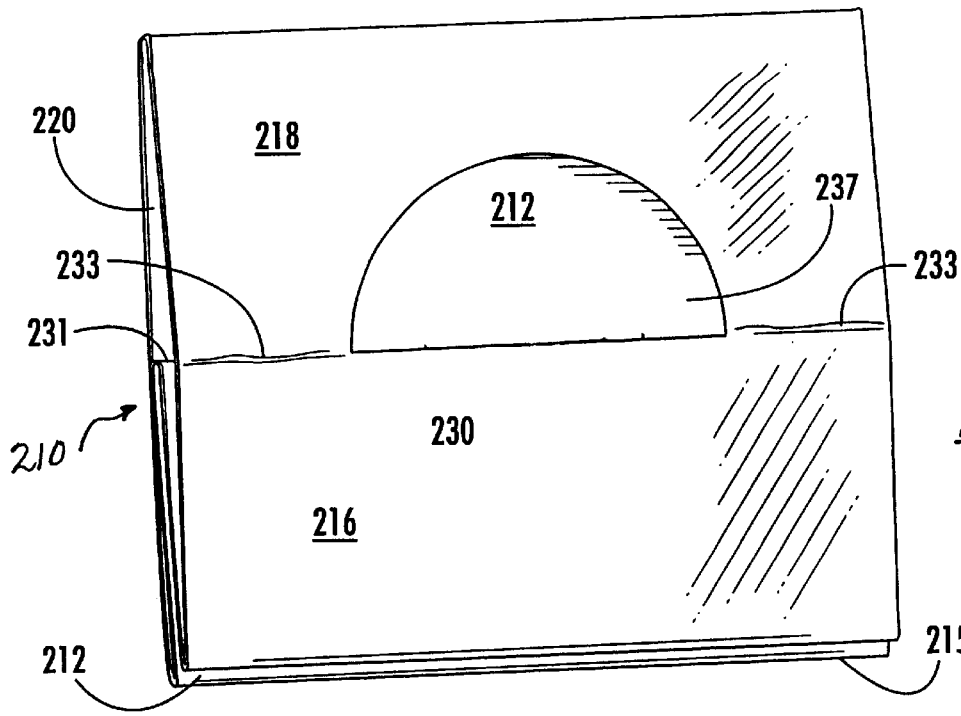
FIG. 11 is a closed view of the embodiment of the display package shown in FIG. 10.
Figure 12:
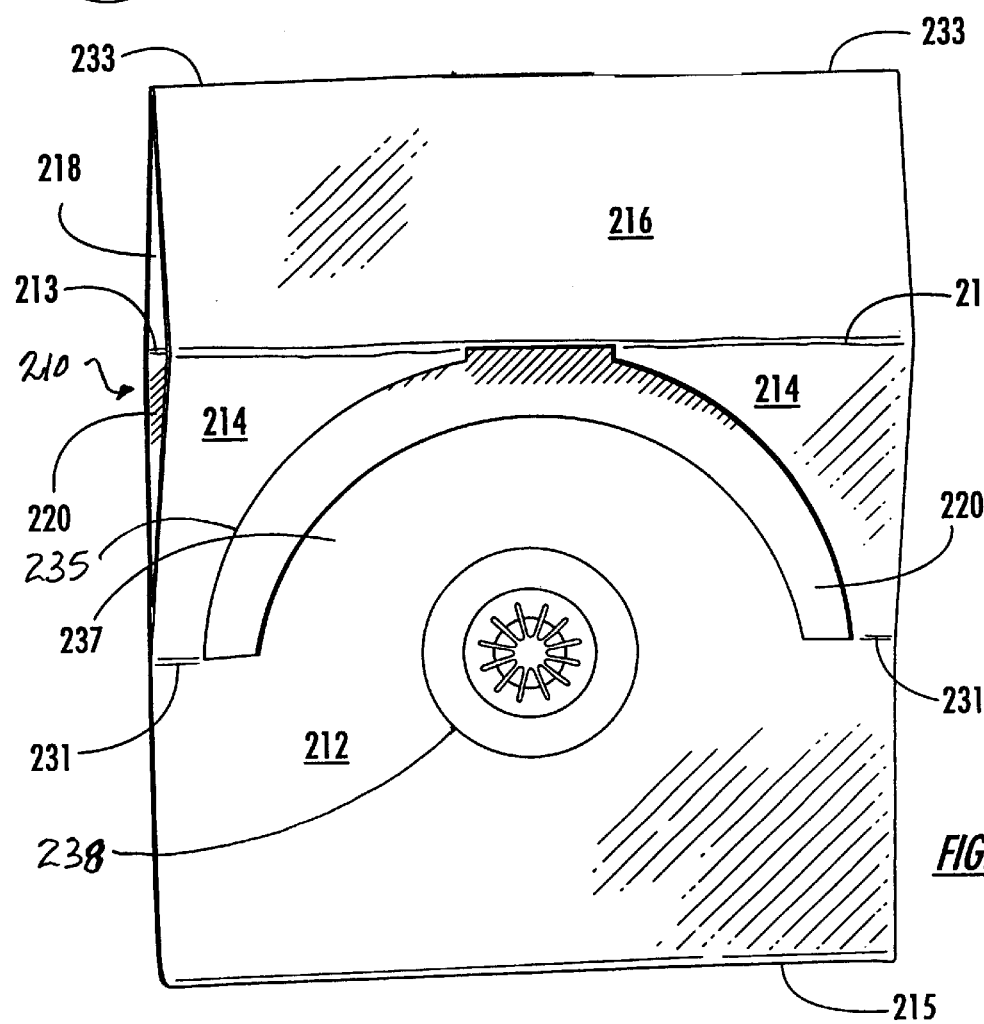
FIG. 12 is an open view of the embodiment of the display package shown in FIG. 10.
Figure 15:
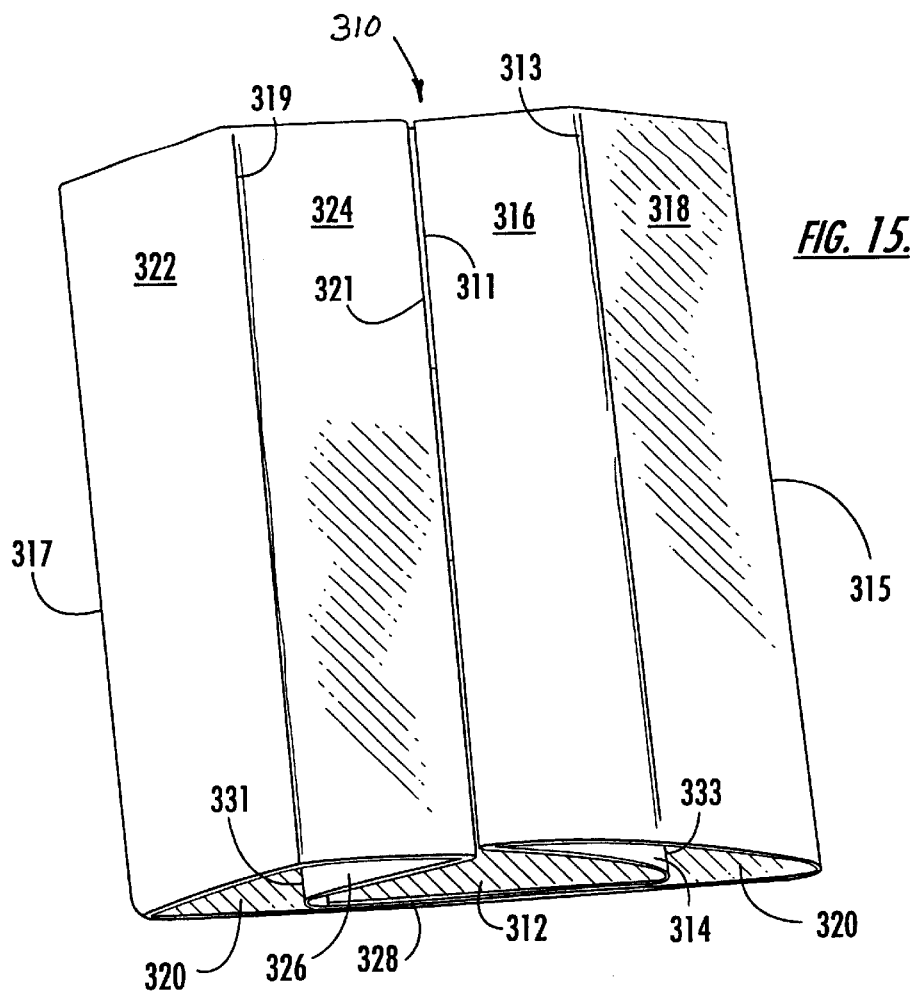
FIG. 15 is a closed view of the embodiment of the display package shown in FIG. 14.

As shown in FIGS. 6–8 the display package 110 is assembled by folding second panel 114 and third panel 116 under first panel 112 and fourth panel 118 at fold lines 111 and 115, respectively. The second and third panels may be glued to the first and fourth panels using glue or other adhesive. When open, as shown in FIG. 8, the CD is displayed on the hub 138. The closed display package 110 ready for mailing, shown in FIG. 7, is then formed by folding panels 116, 118 under panels 112, 114 along fold line 117 and sealing tear panel 129. The resulting package may be opened by removing strip 123 and opening along fold line 117.

A third embodiment of the display package is shown in FIGS. 9–12. In this embodiment of the invention there is shown in FIG. 9 a unitary blank B[2] having a plurality of panels in a generally rectangular configuration. A first panel 220 is integrally formed and hingedly connected along a common fold line 213 to a second panel 218. The second panel 218 is in turn integrally formed with and hingedly connected, along a common fold line 233 to a third panel 216. The third panel 216 is positioned on the side of second panel 218 opposite from panel 220. A semicircular or halfmoon shaped portion 230 maybe die cut from panel 218 along fold line 233. A fourth panel 214 is integrally formed with and hingedly connected to third panel 216 along fold line 211. The fourth panel 214 is positioned on the side of thirdpanel 216 opposite from second panel 218. A fifth panel 212 is provided which is hingedly attached to fourth panel 214 along fold lines 231. An arch-shaped opening 235 is cut into panel 214 that provides a platform 237 on panel 212 for CD hub 239 on panel 212. In the embodiment shown, the arch-shaped opening effectively divided panel 214 into two separate panels. It should be understood that the exact shape of the arched opening is pertinent only insofar as it is needed to provide a place to mount the CD or other media item. A CD hub 238 is provided on the platform portion 237 of panel 212. In order to assemble the display package, end panel 222, attached to the side of panel 212 along fold line 215 opposite panel 216 is provided.

To assemble the display package the panels are folded along the fold lines 213, 233, 211 231 and 215 to form the display package as shown in FIG. 10 having a CD placed on the hub. End panel 222 is glued to first panel 220 to form the package 210. The platform portion 237 of panel 212 may also be affixed to panel 220 to further define the assembled package 210. More specifically, if first panel 220 is placed flat on a table, then second panel 218 is folded upward and third panel 216 is folded back over and parallel to first panel 220. Fourth panel 214 is folded downwardly forming a box with the first three panels, as shown in FIG. 10. Fifth panel 212 is folded at a 90° angle to fourth panel 214 and away from second panel 218 so that it lays flat with a portion of first panel 220. End panel 222 is folded under and against first panel 220 and glued thereto. To close the package panel 216 is moved slightly forward and in doing so moves downward against the open portion of panel 212 to form the closed package shown in FIG. 11. A portion of the CD may be observed through the opening 237.

FIGS. 13–16 form a display package that is a modified version of the third embodiment. In this fourth embodiment of the invention there is shown in FIG. 13 a unitary blank B[3] having a plurality of panels in a generally rectangular configuration. There is a center panel 320 having a series of identical panels to either side for a left side series of panels and a right side series of panels. Looking at the blank B[3] and moving from left to right the left side series of panels starts with first panel 328 is integrally formed and hingedly connected along a common fold line 333 to a second panel 326. The second panel 326 is in turn integrally formed with and hingedly connected, along a common fold line 321 to a third panel 324. The third panel 324 is positioned on the side of second panel 326 opposite from panel 328. An arc shaped opening 342 is cut into panel 326 that provides a platform 332 on panel 328. In the embodiment shown, the arc-shaped opening effectively divides panel 326 into two separate panels. It should be understood that the exact shape of the arched opening is pertinent only insofar as it is needed to provide a place for a CD or other media item to be seen and to allow the box-like end (shown in FIG. 14) to be formed. A fourth panel 322 is positioned on the side of third panel 324 opposite from second panel 326 and hingedly connected to center panel 320 along fold line 317.

The right side of the blank is essentially identical to the left side. More specifically, a right side seventh panel 312 is integrally formed and hingedly connected along a common fold line 331 to an eighth panel 314. The eighth panel 314 is in turn integrally formed with and hingedly connected, along a common fold line 311 to a ninth panel 316. The ninth panel 316 is positioned on the side of eighth panel 314 opposite from right side seventh panel 312. An arc shaped opening 340 is cut into panel 314 that provides a platform 330 on panel 312. In the embodiment shown, the arc-shaped opening effectively divides eighth panel 314 into two separate panels. It should be understood that the exact shape of the arched opening is pertinent only insofar as it is needed to provide a place to mount the CD or other media item. A CD hub 339 is provided. As shown in FIG. 13 the CD hub 338 is located on the platform portion 330 of seventh panel 312. It should be understood that since the left and right sides may be substantially identical on either side of center panel 320, that CD hub 339 may be placed on either seventh panel 312 or first panel 328.

In order to assemble the display package, the left side series of panels and the rights side series of panels are folded as shown in FIG. 14 with seventh panel 312 positioned above panel 328 so that the CD may be seen. Seventh panel 312 may be glued to first panel 328 and first panel 328 glued to center panel 320 to maintain the display package in assembled condition.

Figure 16:
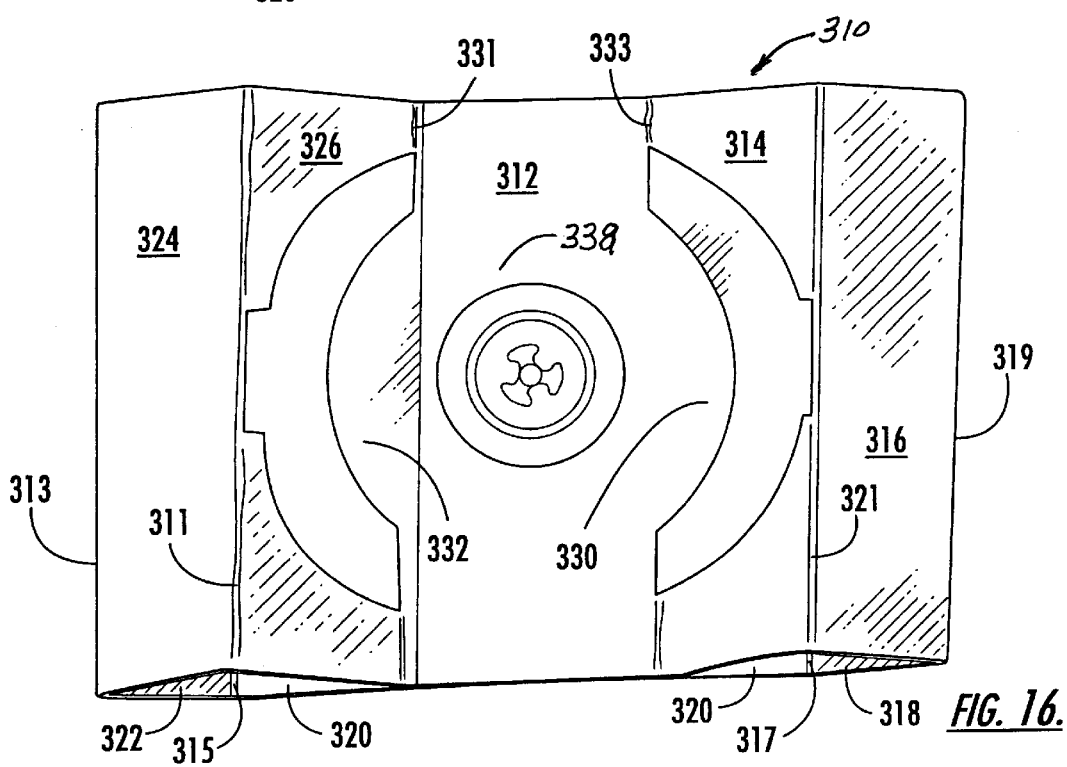
FIG. 16 is an open view of the embodiment of the display package shown in FIG. 14.

In the open position shown in FIG. 16 the CD is attractively displayed. To close the package panels 326 and 314 are moved slightly forward and in doing so each moves downward against the open portion displaying the CD positioned on the platform portion 330 of seventh panel 312 to form the closed package shown in FIG. 15.

As can be seen there has been provided display and mailing packages for CD's and other media items that are attractive, practical, inexpensive and protect the CD. These packages may be shrink wrapped and mailed in that manner. Further, the packages provide an abundance of space to hold various indicia in both open and closed positions.

Many modifications and other embodiments of the invention will come to mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A pop-up display package for holding a media item, said package being formed from a unitary foldable sheet of material such as paperboard comprising:

a first panel;

a second rectangular panel integrally formed with and hingedly connected to a common fold line to said first panel;

said second panel being integrally formed with and hingedly connected, along a fold line to a third rectangular panel positioned to one side of said second panel;

said third panel is integrally formed with and hingedly connected along a common fold line to a fourth panel;

an elongated slot being provided between said first panel and said fourth panel for easy assembly;

a first pop-up panel and a second pop-up panel hingedly connected to a common fold line and said pop-up panels hingedly connected along respective fold lines to said first panel and said second panel respectively, a semicircular slit formed in the fold line connecting said first pop-up panel and said second pop-up panel having a CD hub attached thereto;

said first panel being folded over said second paned and glued thereto, and said fourth panel folded over said third panel and glued thereto;

whereby when a media item is placed on said CD hub said second panel and said third panel may be folded each other over forming the display package.

2. The display package according to claim 1 having a tear strip for sealing said package.

3. The display package according to claim 1 wherein said media item is a CD.

4. A blank formed of unitary material for forming a display, said blank comprising:

a first panel integrally formed with and hingedly connected to a common fold line to a rectangular second panel;

said second panel being integrally formed with and hingedly connected, along a fold line to a rectangular third panel, said third panel positioned to one side of said second panel;

said third panel is integrally formed with and hingedly connected along a common fold line to a fourth panel;

an elongated slot between said first panel and said fourth for easy assembly;

a first pop-up panel and a second pop-up panel hingedly connected to a common fold line and said pop-up panels hingedly connected along respective fold lines to said first panel and said second panel respectively, a semicircular slit formed in the fold line connecting said first pop-up panel and said second pop-up panel adapted to have a media item attached thereto.

5. The blank according to claim 4 further comprising said second pop-up panel having a CD hub attached thereto.

6. A package for a media item, said package being formed from a unitary foldable sheet of material such as paperboard comprising:

a first panel integrally formed with and hingedly connected to a common fold line to a second panel, the width of said first panel being somewhat narrower than the width of said second panel;

said second panel being integrally formed with and hingedly connected, along a fold line to a third panel, said third panel positioned on the side of said second panel opposite said first panel;

said third panel is integrally formed with and hingedly connected along a common fold line to a fourth panel, said fourth panel being positioned on the side of said third panel opposite from said second panel;

a fifth panel is provided which is hingedly attached to said fourth panel along fold lines; and an arch-shaped opening is cut into said fourth panel to provide a platform on said fifth panel for mounting a CD hub thereon, said second third and fourth panels folded so a to form a box-like structure and folding said fifth panel is such manner as to lay flat on a portion of said first panel so as to display said media item when said box-like structure is in an open position.

7. The package according to claim 6 wherein an opening is provided in said second panel of such size as to enable one to view at least a portion of said media item.

8. The package according to claim 6 wherein said media item is a CD.

9. The package according to claim 6 further comprising: a seventh panel integrally formed and hingedly connected along a common fold line to an eighth panel; said eighth panel being in turn integrally formed with and hingedly connected, along a common fold line to a ninth panel, said ninth panel being positioned on the side of eighth panel opposite from seventh panel; and an arc shaped opening of such size as to accommodate a CD hub is cut into said eighth panel; said seventh, eighth, ninth and tenth fourth panels folded so a to form a box-like structure and folding said tenth panel in such manner as to lay flat on a portion of said first panel or said center panel so as to display said media item when said box-like structure is in an open position.

* * * * *

UNITED STATES PATENT AND TRADEMARK OFFICE
CERTIFICATE OF CORRECTION

PATENT NO.    : 6,279,739 B1
DATED         : August 28, 2001
INVENTOR(S)   : Moore et al.

It is certified that error appears in the above-identified patent and that said Letters Patent is hereby corrected as shown below:

<u>Title page,</u>
Item [56], References Cited, U.S. PATENT DOCUMENTS, insert the following:
-- 3,235,988   2/1966   Paige
   4,657,612   4/1987   Schoenleber
   4,867,480   9/1989   Volkert
   5,685,424   11/1997  Rozek et al. --.

Signed and Sealed this

Twenty-third Day of April, 2002

Attest:

Attesting Officer

JAMES E. ROGAN
*Director of the United States Patent and Trademark Office*